(12) United States Patent
Reason et al.

(10) Patent No.: US 6,543,242 B2
(45) Date of Patent: Apr. 8, 2003

(54) GENERATOR POWER MANAGEMENT

(75) Inventors: John Robert Reason, Liverpool, NY (US); Joao Eduardo Navarro de Andrade, Cicero, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/174,124

(22) Filed: Jun. 17, 2002

(65) Prior Publication Data

US 2002/0162344 A1 Nov. 7, 2002

Related U.S. Application Data

(62) Division of application No. 09/761,012, filed on Jan. 16, 2001, now Pat. No. 6,405,550, which is a division of application No. 09/277,509, filed on Mar. 26, 1999, now Pat. No. 6,196,012.

(51) Int. Cl.[7] .............................. F25B 49/02; F25B 41/04
(52) U.S. Cl. ........................... 62/228.4; 62/217; 62/230
(58) Field of Search .......................... 62/228.1, 228.4, 62/228.5, 230, 215, 209, 210, 239, 323.1, 323.4, 229

(56) References Cited

U.S. PATENT DOCUMENTS 3,220,211 A  * 11/1965 Nordquest .................. 62/228.4
4,494,382 A    1/1985 Raymond ..................... 62/160
4,735,058 A  * 4/1988 Umezu et al. ............. 62/230 X
4,736,595 A  * 4/1988 Kato ....................... 62/228.4 X
5,771,704 A  * 6/1998 Nakajima et al. .......... 62/228.4
6,065,298 A  * 5/2000 Fujimoto ..................... 62/230

FOREIGN PATENT DOCUMENTS

EP    0 435 487 B1    5/1994
EP    0 522 847 B1    5/1995
EP    0 969 257 A2    5/2000

OTHER PUBLICATIONS

European Search Report—Apr. 23, 2002 application No. 00200899.3–1268.

* cited by examiner

Primary Examiner—Harry B. Tanner
(74) Attorney, Agent, or Firm—Niro, Scavone, Haller & Niro

(57) ABSTRACT

A system and method for monitoring and controlling an electrically driven transport refrigeration unit under varying operating conditions while maintain the system generator within its electric current and temperature limitations is disclosed. Specifically, the present invention the management of generator power through the combined use of controls for a suction modulation valve (an "SMV"), for diesel engine speed control, and for electronic expansion valve ("EXV") superheat settings.

1 Claim, 5 Drawing Sheets

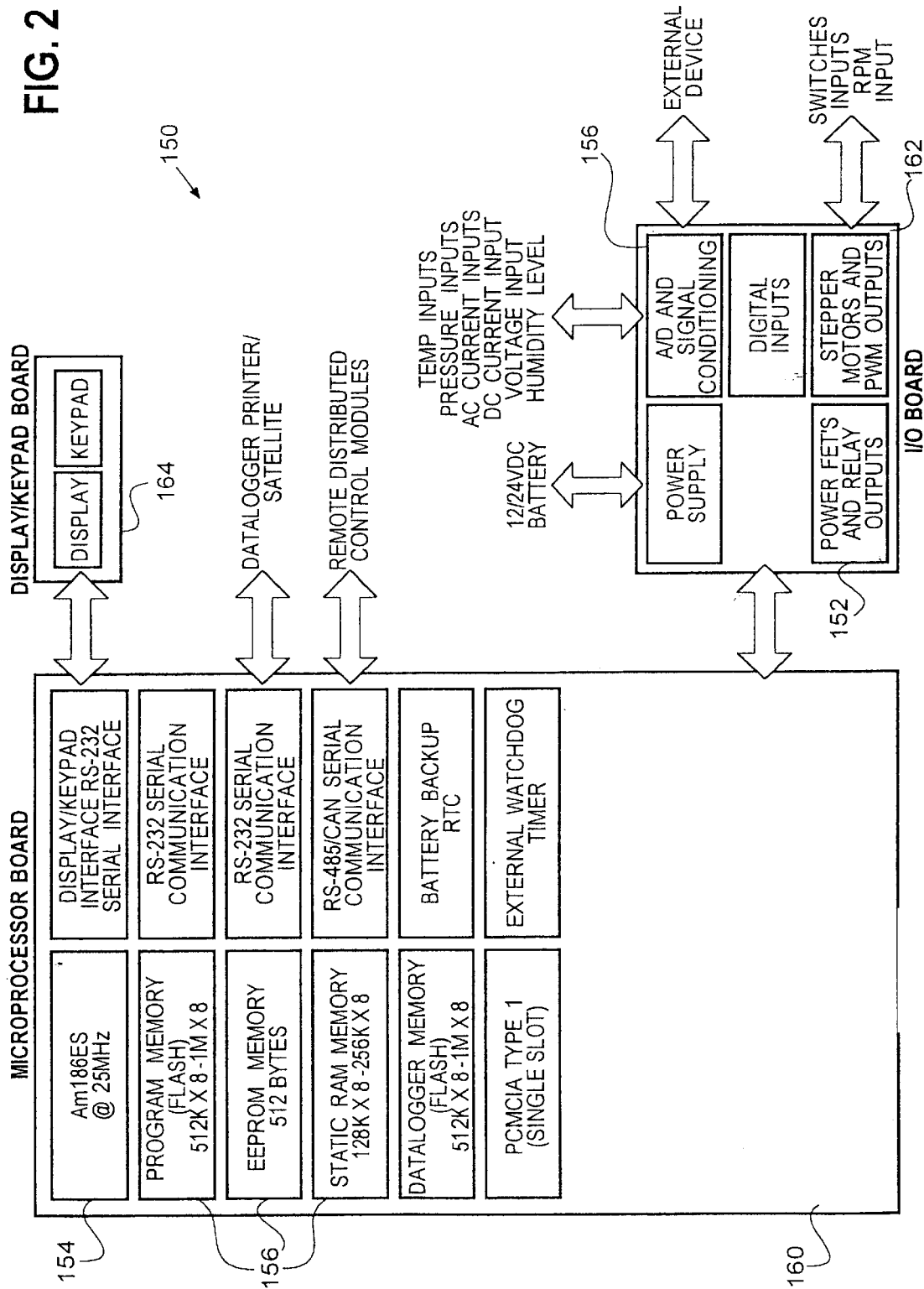

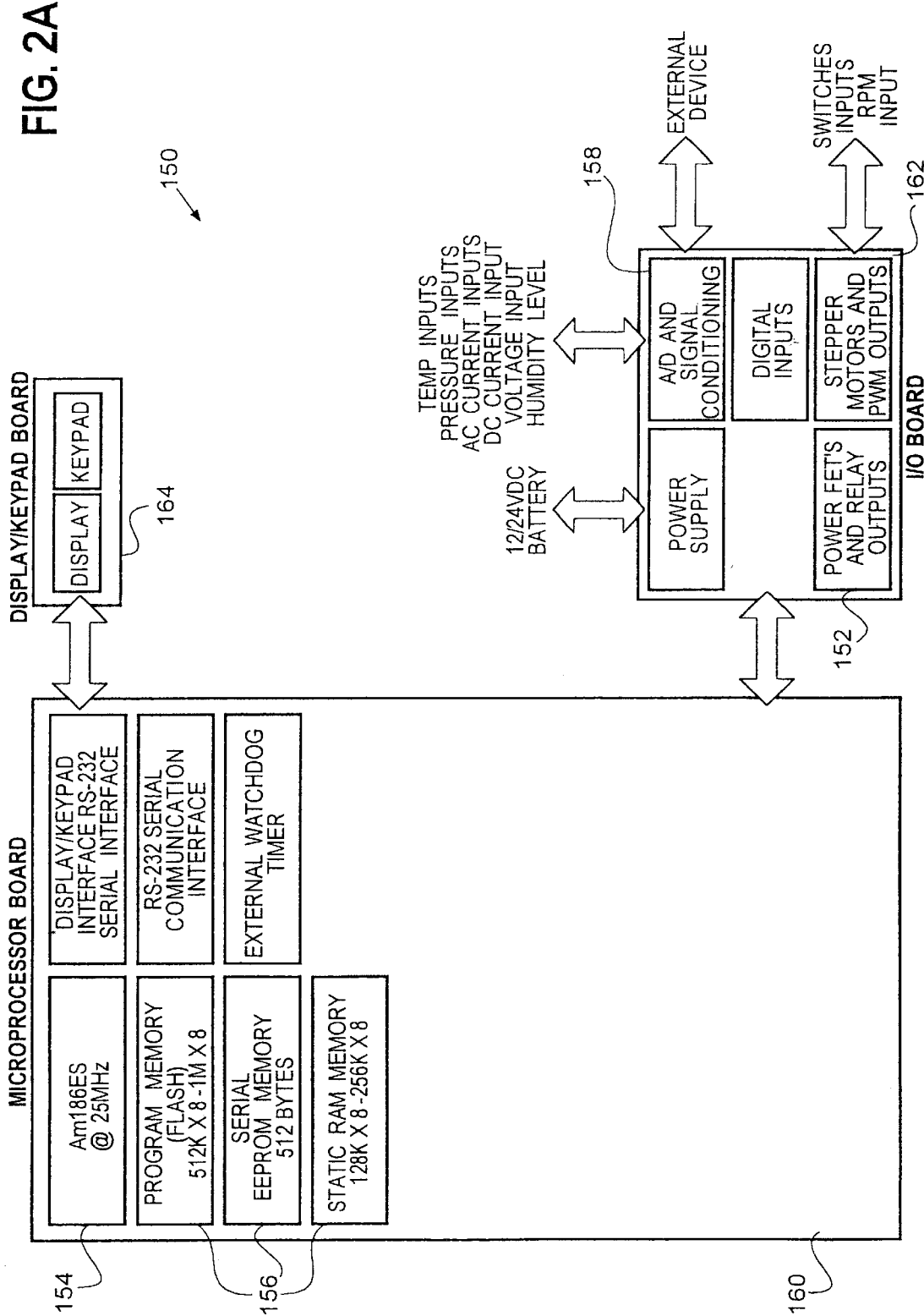

GENERATOR POWER MANAGEMENT

This application is a divisional application of prior application Ser. No. 09/761,012, filed Jan. 16, 2001 now U.S. Pat. No. 6,405,550 which is a divisional of Ser. No. 09/277,509, filed Mar. 26, 1999 now U.S. Pat. No. 6,196,012.

I. FIELD OF THE INVENTION

The field of the present invention relates to control systems for transport refrigeration systems. More specifically, the present invention is directed towards controlling the generator power requirements through the combined control of the suction modulation valve (the "SMV") the compressor cylinder unloaders, the speed of the diesel engine for the system, and the superheat setting of the expansion valve.

II. DESCRIPTION OF THE PRIOR ART

A common problem with transporting perishable items is that often such items must be maintained within strict temperature limits, regardless of potentially extreme operating conditions required by a high ambient temperature and/or other factors. These extreme conditions can cause an excessive power draw from the diesel engine powering the system, thus potentially causing unwanted system shutdowns or even adversely impacting the useful life of the engine. Recent inventions by the assignee of the present application have enabled significant cost savings through the implementation of an electrically driven trailer refrigeration unit from a synchronous permanent magnet generator. However, the use of this new system has a disadvantage of significant power supply limitations compared to prior art devices. Thus, there is a need for an efficient controller which optimizes power management for the draw placed upon the generators of such transport systems.

Currently available controller designs sold by assignee disclose the use of suction modulation valves ("SMVs") to limit the maximum system current draw. In addition, such units use a suction modulation valve (SMV) to limit the maximum system current draw, but not to control the voltage. The SMVs of such systems close quickly, but result in pressure drop problems which limit peak capacity problems, and create reliability and efficiency issues. In addition, previously available prior art controls are comparatively crude to that needed for newer, power limited systems, which call for sophisticated, combined controls that monitor and manipulate superheat settings, compressor cylinder unloaders, and engine speed in order to prevent unacceptable power draw on the transport refrigeration system. The inventors of the system and process disclosed in the present application have found significant improvements in generator power management by controlling just such parameters, thus decreasing system component wear and tear and increasing the engine and generator life.

III. SUMMARY OF THE INVENTION

The apparatus and control method of this invention provides a refrigeration unit for a transport system having a controller which monitors and prevents power draw overload conditions for the generator in situ. For example, the algorithm in the controller is designed to adjust for changes in box temperature and speed changes. The present invention manages power (indirectly) by monitoring and controlling engine speed and current. The controller of the present system is designed to avoid overpowering the generator and the engine (i.e., just to maintain the generator and the engine unit running), and is further designed to avoid shut down (and potentially, damage). Such conditions are avoided by staying below a preselected maximum system power limit rating.

The present invention does not maximize capacity in in the box or container of the transport refrigeration system, the present invention is rather directed towards minimizing the limits place upon current level—thus, the present invention seeks minimize the reduction of the optimal refrigeration capacity level. Power, and consequently current draw, rise and fall with mass flow. Thus, the controller of the present invention monitoring current and controls mass flow as a means to control power draw on the generator.

Also, the present invention seeks to limit the temperature of the generator by controlling the SMV. If the generator temperature for a permanent magnet rotor exceeds a certain point it will demagnetize and thus require an expensive and time consuming overhaul. Thus, the controller of the present unit monitors generator temperature and restricts mass flow in the system (thus decreasing power draw in the event the generator temperature is above a preselected limit. Specifically, the generator temperature sensed goes above a "soft" limit, the controller further restricts the SMV (indirectly, by reducing the maximum allowable current, through the PID control in the processor). If the generator temperature sensed goes above a "hard" limit, then an alarm is issued, and the unit may initiate shut down.

Finally, the present invention seeks to minimize or eliminate the step function caused by the deenergizing of each loader of the system compressor, which load two additional cylinders in the compressor. Each deenergized unloader, when deenergized, has the effect of increasing mass flow at least 50%, and can increase current beyond the maximum current draw permitted. Thus, the present invention, using programming in the microprocessor of the controller, increases the superheat setting, which results in restricting the electronic expansion valve (the "EXV") and thus reduces the mass flow prior to the unloader being deenergized. The superheat setting (and thus the EXV) is then gradually reduced to its initial base levels once the current draw sensed is below a preselected limit.

BRIEF DESCRIPTION OF THE DRAWING

FIG. 2 shows a block schematic of a first preferred embodiment of a controller of the present invention; and FIG. 2a shows a block schematic of a second preferred embodiment of a controller of the present invention.

IV. DETAILED DESCRIPTION OF THE INVENTION

The invention that is the subject of the present application is one of a series of applications dealing with transport refrigeration system design and control, the other copending applications including: "Voltage Control Using Engine Speed"; "Economy Mode For Transport Refrigeration Units"; "Compressor Operating Envelope Management"; "High Engine Coolant Temperature Control"; "Superheat Control for Optimum Capacity Under Power Limitation and Using a Suction Modulation Valve"; and "Electronic Expansion Valve Control Without Pressure Sensor Reading" all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" "Electrically Powered Trailer Refrigeration Unit With Integrally Mounted Diesel Driven Permanent Magnet Generator;" and "Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference.

Figure 1:
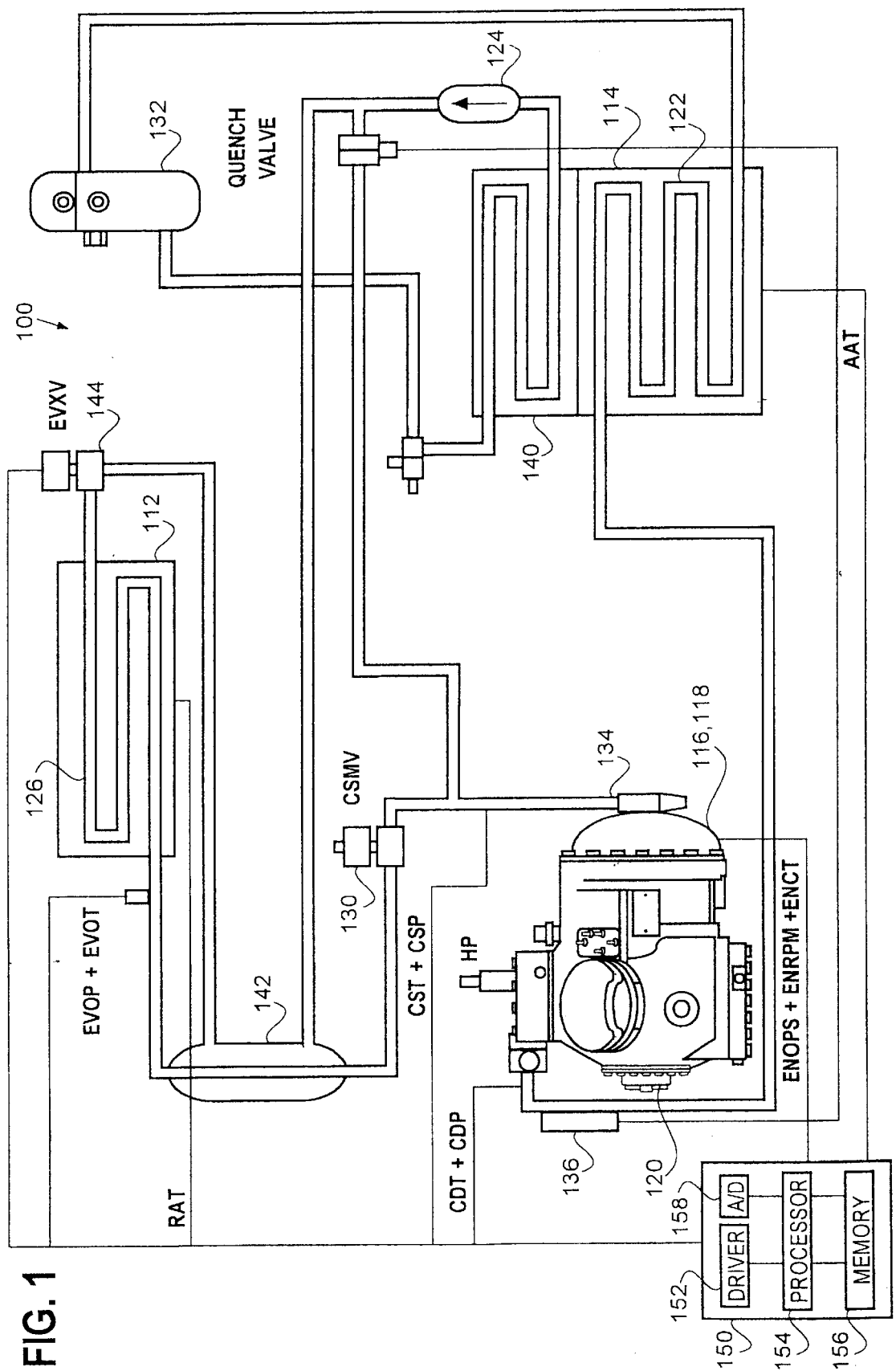
FIG. 1 shows a schematic of the transport refrigeration system of the present invention.

FIG. 1 illustrates a schematic representation of the transport refrigeration system 100 of the present invention. The refrigerant (which, in its most preferred embodiment is R404A) is used to cool the box air (i.e., the air within the container or trailer or truck) of the refrigeration transport system 100. is first compressed by a compressor 116, which is driven by a motor 118, which is most preferably an integrated electric drive motor driven by a synchronous generator (not shown) operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cylinder compressor 116 having a displacement of 600 cc, the compressor 116 further having two unloaders, each for selectively unloading a pair of cylinders under selective operating conditions. In the compressor, the (preferably vapor state) refrigerant is compressed to a higher temperature and pressure. The refrigerant then moves to the air-cooled condenser 114, which includes a plurality of condenser coil fins and tubes 122, which receiver air, typically blown by a condenser fan (not shown). By removing latent heat through this step, the refrigerant condenses to a high pressure/high temperature liquid and flow to a receiver 132 that provides storage for excess liquid refrigerant during low temperature operation. From the receiver 132, the refrigerant flows through subcooler unit 140, then to a filter-drier 124 which keeps the refrigerant clean and dry, and then to a heat exchanger 142, which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the exhanger 112 through a suction modulation valve (or "SMV") back into the compressor.

Many of the points in the transport refrigeration system are monitored and controlled by a controller 150. As shown in FIGS. 2 and 2A Controller 150 preferably includes a microprocessor 154 and its associated memory 156. The memory 156 of controller 150 can contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FETs") and relays which receive signals or current from the controller 150 and in turn control various external or peripheral devices in the system 100, such as SMV 130, EXV 144 and the speed of engine 118 through a solenoid (not shown).

Among the specific sensors and transducers most preferably monitored by controller 150 includes: the return air temperature (RAT) sensor which inputs into the processor 154 a variable resistor value according to the evaporator return air temperature; the ambient air temperature (AAT) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVOT) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable voltage according to the compressor suction value of compressor 116; the compressor discharge pressure (CDP) transducer, which inputs to microprocessor 154 a variable voltage according to the compressor discharge value of compressor 116; the evaporator outlet pressure (EVOP) transducer which inputs to microprocessor 154 a variable voltage according to the evaporator outlet pressure or evaporator 112; the engine oil pressure switch (ENOPS), which inputs to microprocessor 154 an engine oil pressure value from engine 118; direct current and alternating current sensors (CT1 and CT2, respectively), which input to microprocessor 154 a variable voltage values corresponding to the current drawn by the system 100 and an engine RPM (ENRPM) transducer, which inputs to microprocessor 154 a variable frequency according to the engine RPM of engine 118.

In the present invention, the power consumed by the compressor 116 varies directly with the mass flow rate of the refrigerant. Suction modulation valve or SMV 130 is used to provide the possibility of creating a restriction to refrigerant, thus causing a consequent reduction in power draw. Power consumption in monitored indirectly by controller 150 through measurement of current received through I/O board 156. A proportional, integral and derivative control used by processor 154 based upon the actual generator current measured relative to the allowable generator current as stored in memory 156 is then used to control the position of SMV 130 and limit the generator current while maximizing system 100 refrigeration capacity. Thus the SMV 130 eventually restricts mass flow rate to the point where the actual current rate drops below the predetermined maximum level as stored in the memory 156 of controller 150.

SMV 130 is also used to limit the temperature of the generator, as input to the controller as GENT. If GENT is above the timed maximum generator temperature as defined in the configuration parameter stored in memory 156 for a preselected time frame (preferably greater than 5 minutes), then the maximum allowable generator current (which is programmed in controller 150) is reduced by 1 amp. This will, in most instances, cause the SMV 130 to close and reduce power draw. If, however, after a preselected time frame (e.g., 5 minutes) the GENT value is still above the preselected limit, the generator current limit is further reduced by an additional, preselected amount (e.g., 5 amps) and held at this level for a preselected time (e.g., 10 minutes). If after this period the temperature is still above the timed maximum generator temperature, a high generator temperature alarm is triggered and the operator is notified through display 164. If the temperature is below the timed maximum generator temperature, processor 154 restores the maximum allowable generator limit, most preferably at the rate of 1 amp per minute.

The present invention further includes an engine speed control to limit unnecessary power draw on the generator. As mentioned above, a preferred embodiment of the present invention includes a diesel engine 118 that has two settings—high speed and low speed. Because generator 120 has more available power when the engine is operating in high speed, controller 150 allows a higher maximum current draw from the generator 120 in high speed mode. However, any time the system 100 requires a transition from high speed to low speed (e.g., capacity control, fuel savings, high ambient temperature, etc.) the maximum allowable current draw has to be adjusted to reflect the lower available power from generator 120 in low speed. Controller 150 accomplishes this function by immediately reducing the maximum current limit value used to control the SMV 130 when low operation is requested, but then also delay the actual speed reduction control signal until either: 1) the actual current draw value measures is equal to (or lower than) the low engine speed current limit; or 2) a preselected time limit (preferably at least 40 seconds) elapses from the time that the low speed request is received by controller 150.

Figure 3:
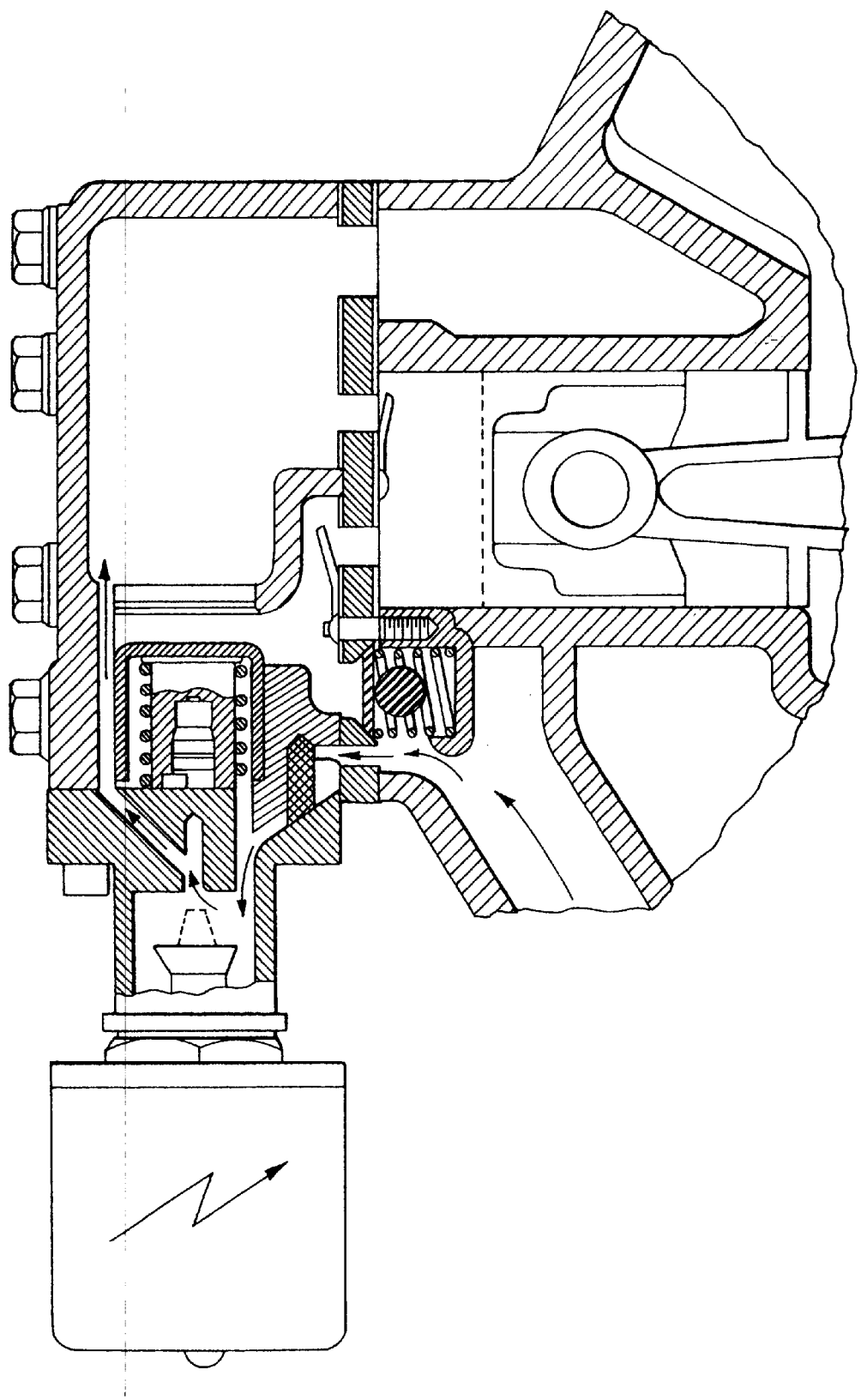
FIGS. 3 and 3a, respectively, show an exposed cross-sectional view of the unloaders of the compressor of the present invention in energized and deenergized states, respectively.
Figure 3A:
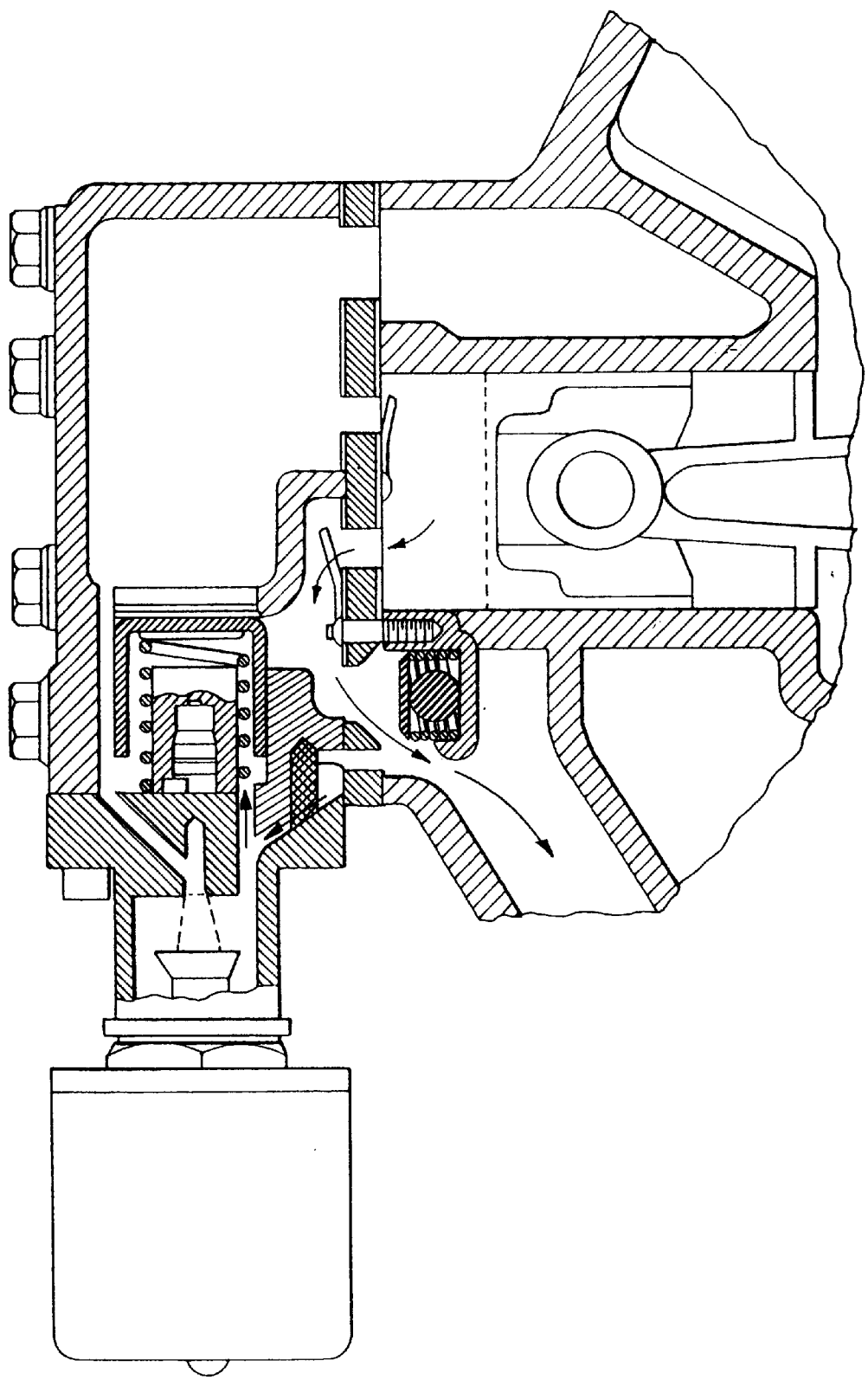

Finally, the present invention manages generator power through the control of flow rate in the event of compressor unloader deenergizing. As mentioned above and shown in FIGS. 3 and 3A, the preferred embodiment of the present invention includes a compressor 116 having six cylinders and two unloaders. Each unloader, when energized, unloads a bank of two cylinders. Thus, when a cylinder bank is loaded there is a step increase of at least 50% (i.e., 2 to 4 cylinders, or 4 to 6 cylinders) in the refrigerant mass flow rate, and a consequent increase in power consumption. To reduce risk of damage to the generator due to such a "spike" in power consumption, the controller 150 monitors the actual generator current and prevents the unloaders from deenergizing when the actual generator current is equal to or greater than the maximum allowable generator current value, as stored in memory 156.

The present invention has a further power consumption protection mechanism in the unloader deenergizing process. Specifically, prior to controller issuing a control signal requesting a cylinder bank to be loaded, controller 150 first adds to the superheat setting of the EXV 144 (as stored in memory) by a fixed amount. The increase in superheat setting causes EXV 144 to close, thus restricting the mass flow of the refrigerant, thus dissipating any impact on power draw which the additional cylinder bank being loaded might have. The controller 150 then gradually reduces the superheat setting (i.e., controllably opens the EXV) to its original value. Thus, the controller 150 of the present invention seeks to combine controls over engine speed, superheat (EXV) settings, SMV settings, and maximum current draw limits in order to prevent unnecessary power draw on the generator 120 in a variety of operating conditions.

It will be appreciated by those skilled in the art that various changes, additions, omissions, and modifications can be made to the illustrated embodiments without departing from the spirit of the present invention. All such modifications and changes are intended to be covered by the following claims.

We claim:

1. A process for accommodating a change in speed from high to low engine speed conditions for a multispeed engine on an electrical transport refrigeration unit, said refrigeration unit being controlled by a microprocessor, said process comprising the steps of:
    i. receiving one or more operating parameters;
    ii. analyzing said operating parameters to determine whether low engine speed conditions are present;
    iii. selectively actuating a suction modulation valve in response to the presence of said low engine speed conditions, thereby reducing the current draw below a predetermined current draw limit corresponding to low engine speed conditions, said predetermined current draw limit being stored in said microprocessor; and
    iv. delaying the actual speed reduction of said engine until the current draw of said transport refrigeration unit does not exceed said predetermined current draw limit.

* * * * *